United States Patent [19]

Tarzaiski

[11] Patent Number: 4,598,325
[45] Date of Patent: Jul. 1, 1986

[54] APPARATUS FOR TRANSMITTING DIGITAL SIGNALS ACROSS A ROTARY GAP

[75] Inventor: Richard J. Tarzaiski, Camden, N.J.

[73] Assignee: RCA Corporation, Princeton, N.J.

[21] Appl. No.: 738,862

[22] Filed: May 29, 1985

[51] Int. Cl.[4] .................. G11B 5/09; G11B 15/14; G11B 5/02

[52] U.S. Cl. .................. 360/39; 360/64; 360/67; 360/108

[58] Field of Search ............... 360/130.22, 39, 108, 360/64, 67

[56] References Cited

U.S. PATENT DOCUMENTS

| | | |
|---|---|---|
| 2,414,968 | 1/1947 | Moe . |
| 2,946,957 | 7/1960 | Beter et al. . |
| 3,381,083 | 4/1968 | Jensen et al. .................. 360/65 X |
| 3,445,608 | 5/1969 | Kinjo et al. .................. 360/64 X |
| 3,499,997 | 3/1970 | Kosugi et al. .................. 360/64 |
| 3,524,017 | 8/1970 | Pezirtzoglov .................. 360/67 |
| 4,455,584 | 6/1984 | Heitmann .................. 360/108 |

Primary Examiner—Raymond F. Cardillo
Assistant Examiner—Alyssa H. Bowler
Attorney, Agent, or Firm—Joseph S. Tripoli; Robert L. Troike; Christopher L. Maginniss

[57] ABSTRACT

An apparatus is disclosed for coupling digital signals across a rotary mechanical gap as, for example, in a helical scan optical or magnetic tape recording/playback system where it is required to couple digital signals having a wide range of pulse widths between the stationary portion of the system and the rotating headwheel. The apparatus includes a rotary transformer comprising inductively-coupled first and second coils located, respectively, in the stationary and rotating portions. A capacitor positioned between the signal source and the primary winding of the rotary transformer converts the pulsed digital signals from the source into signals of changing current so that pulses of variable widths are efficiently coupled through the transformer. In this way, digital pulses having width ratios of approximately five-to-one can be transmitted across the gap.

16 Claims, 2 Drawing Figures

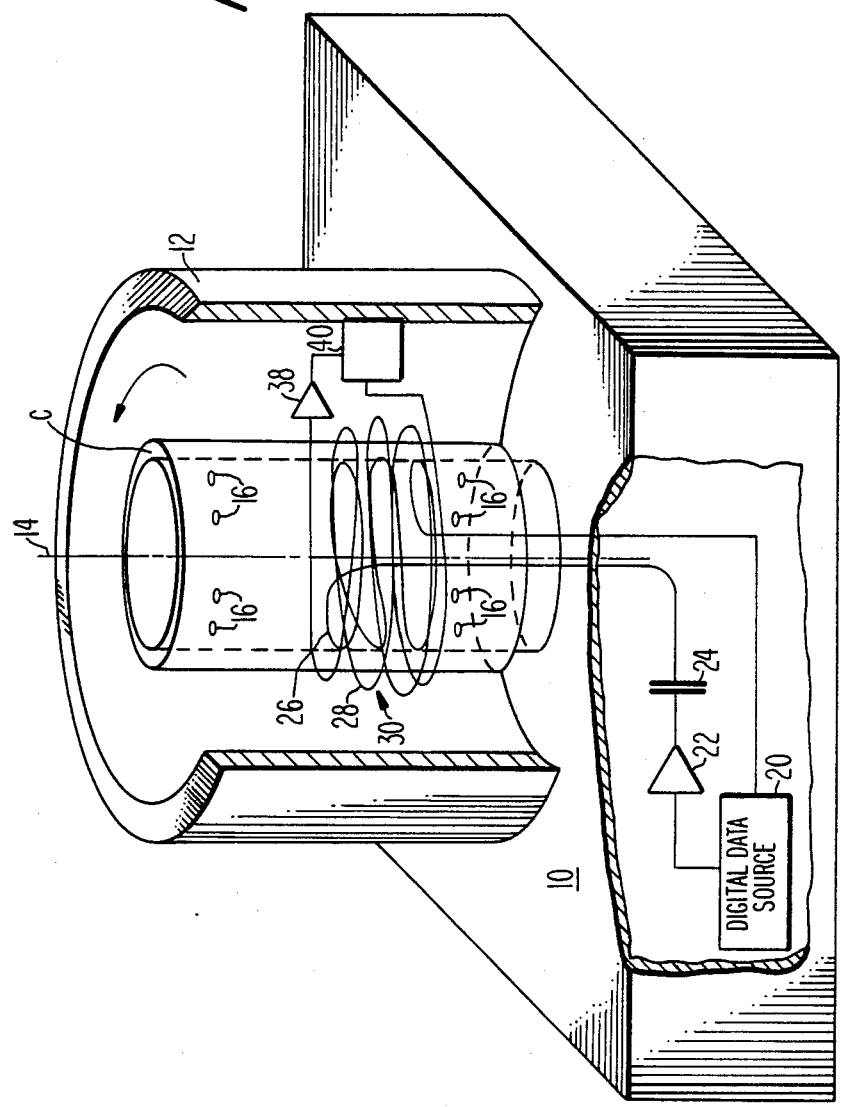

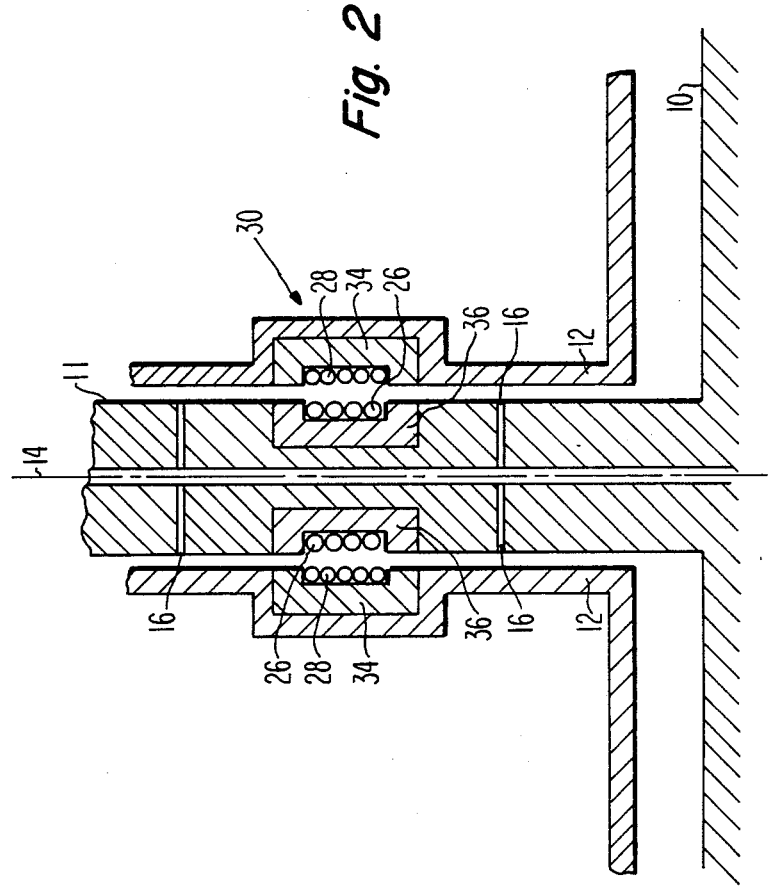

APPARATUS FOR TRANSMITTING DIGITAL SIGNALS ACROSS A ROTARY GAP

The Government has rights in this invention pursuant to a Government Contract.

This invention relates generally to digital signal transmission and, more particularly, to an apparatus for coupling digital signals between an optical or magnetic tape recorder and its rotating headwheel.

BACKGROUND OF THE INVENTION

In modern high-speed helical scan tape record/playback systems for use with magnetic or optical tape media in digital data recording applications, there is a need for transmission of wide bandwidth electrical signals between the rotating headwheel and the stationary portion of the recording/playback system. One method for electrically bridging the gap between the stationary and rotating assemblies involves the use of a slip-ring assembly, in which a conductive rotating ring is maintained in physical contact with a stationary brush. This method, however, is very susceptible to noise and, at the data rates in use by the systems contemplated, such noise as a slip-ring assembly generates may obliterate a significant amount of information.

A second method involves the transmission of light signals, modulated so as to convey information. Light signals provided by a laser, for example, may be directed axially onto the headwheel where a system of optics, e.g., mirrors, prisms, fiber optics, steer the beam onto a detector which converts the radiant energy to an electrical signal. This method is relatively complex and inefficient, and it requires extremely close tolerances in the alignment of the optical elements.

A third method, which is quite simple and relatively efficient, involves the use of inductive coupling across the gap between the rotating and stationary assemblies. A first winding in the stationary portion and a second winding in the rotating portion, when inductively coupled, comprise a rotary transformer. A driver circuit for use with a rotary transformer in a tape recording system is disclosed in U.S. Pat. No. 3,524,017, "Record Amplifier-Driver for Continuously Driving Analog Recorder Heads with an Optimum Record Current During the Life of the Head," issued Aug. 11, 1970, to E.I. Pezirtzoglou.

In high speed (5 to more than 20 Mbits per second) tape recording/playback systems in current use, data signals are transmitted between the stationary electronics and the rotating headwheel electronics at very high rates. Such signals are effectively passed through wideband transformers. Lower data rate systems (200 Kbits to 2 Mbits per second), however, strain the ability of a transformer to transmit the associated pulse widths faithfully, and, in particular, to transmit digital data streams containing a wide range of pulse widths. It is known that a transformer can effectively couple only ac signals, or dc pulses within a restricted range of pulse widths, between its windings. In order to use rotary transformers in applications where wide pulse widths must be accommodated, digital signals must be modulated in some fashion in order to pass over the gap and be detectable. Modulation of a digital signal necessarily entails further complexity and a reduction in the rate at which the data is communicated.

The present invention permits the transmission of digital information having a relatively wide bandwidth across a rotary mechanical gap while retaining the advantages of a rotary transformer.

SUMMARY OF THE INVENTION

In accordance with the principles of the present invention, an apparatus is disclosed for coupling digital signals from a source to a utilization means, where the digital signals are transmitted between a stationary platform and a rotatable carriage, wherein the rotatable carriage is adapted to be rotated about a shaft on the stationary platform. The apparatus comprises a first inductive element wound about the axis of the shaft and a second inductive element on the rotatable carriage positioned so as to be inductively coupled with the first inductive element. One of the two inductive elements is a primary coil and is coupled to the source, and the other of the two inductive elements is a secondary coil and is coupled to the utilization means. The apparatus further includes means for diminishing over a period of time the potential across the primary coil produced by the voltage levels of each of the digital signals from the source, to thereby provide signals of changing current through the primary coil.

BRIEF DESCRIPTION OF THE DRAWINGS

FIG. 1 is a functional schematic diagram of the preferred embodiment of the present invention; and FIG. 2 is a cross-sectional view showing the position of the windings of the rotary transformer of the embodiment of FIG. 1.

DETAILED DESCRIPTION OF THE PREFERRED EMBODIMENT

Referring to FIG. 1, there is shown that portion of a high-speed tape recording system relevant to the present invention. The system of the example to be described is a multi-channel, high-speed, low power, highly portable, record-only equipment, useful for recording information on optical or magnetic tape.

In the system of the present example, data are recorded on each channel of the tape using a highly efficient run-length-limited (RLL) code designated $3\phi(1,7)$. This coding technique imposes a constraint on the transitions of the digital signals such that they must occur within not less than two and not more than eight periods of the basic clocking interval. For a basic data rate of 3.75 Mbits per second, the minimum pulse duration of the (1,7) code is approximately 350 nanoseconds and the maximum pulse duration is approximately 1400 nanoseconds. In terms of effective square wave frequencies of the data signals transmitted to the record head, this data rate converts to a range of frequencies between about 350 KHz and 1.5 MHz. Insertion of appropriate synchronization signals into the data stream can extend the lower end of the frequency range to approximately 285 KHz.

In FIG. 1, platform 10 and shaft 11, extending therefrom, are stationary elements of a tape recording system, and carriage 12 is positioned such as to be rotatable about shaft 11. Carriage 12, which may typically be a headwheel, is caused to rotate about the central axis 14 of shaft 11 in close proximity to shaft 11, illustratively, with a clearance c of less than 0.001 inch. The spacing between shaft 11 and carriage 12 may be maintained by a bearing comprising a cushion of pressurized air, introduced through a multiplicity of orifices in shaft 11, collectively designated 16, which communicate with a source of pressurized air (not shown).

The motive force for rotating carriage 12 may typically be a motor (not shown) having fixed stator windings inductively coupled to rotor windings (not shown) in carriage 12. The method and means by which carriage 12 rotates is not of importance to an understanding of the present invention, as the data transmission between the stationary and rotatable portions of the system will be effected whether or not the carriage is rotating.

A source 20 of digital data to be recorded on a tape (not shown) is coupled via driver 22 and a capacitor 24 into primary winding 26. Driver 22 may be similar to type 74HC244, high frequency CMOS driver/receiver, sold by, for example, Motorola Semiconductor Products Sector, of Phoenix, Ariz. Driver 22 has a high, virtually infinite, input impedance, and an output impedance capable of driving rotary transformer 30, typically 267 ohms. In the present example, capacitor 24 has a value of 1.0 microfarad.

Primary winding 26 is positioned in shaft 11 about central axis 14. A secondary winding 28, in rotatable carriage 12, is positioned in correspondence with primary winding 26 such that the two windings are inductively coupled and comprise a rotary transformer 30.

In addition to secondary winding 28, rotatable carriage 12 includes receiver 38 and signal utilization circuit 40, coupled as shown in FIG. 1. Receiver 38 may typically be identical in structure of the device used as driver 22, a low power device having an extremely high input impedance. In the present example, circuit 40 includes a recording stimulus, which may be, illustratively, a laser diode with its low impedance driver circuit.

Referring to FIG. 2, there is shown a cross sectional view of a portion of the recording system including rotary transformer 30. Imbedded in shaft 11 are primary winding 26 and annular coil form 36, which is fabricated of a magnetically permeable substance. In a corresponding location on carriage 12 are secondary winding 28 and annular coil form 34, of a material similar to that of coil form 36. Annular coil forms 36 and 34, in close proximity to windings 26 and 28, respectively, provide paths for the flux lines of the magnetic fields generated by the currents through windings 26 and 28. Primary winding 26 and secondary winding 28, together with their corresponding annular coil forms 36 and 34, respectively, comprise rotary transformer 30.

In order to understand the operation of the system of the present example, it is helpful to analyze first how the system would function in the absence of capacitor 24. Without capacitor 24 in the primary circuit, a positive pulse out of driver 22 is coupled to primary winding 26, quickly developing across winding 26 a potential equal to the voltage level of the digital pulse. The build-up of potential is impeded only by the inductance and resistance of winding 26. During the time that the potential is building up across primary winding 26, there is a change of current through winding 26 which induces a potential across secondary winding 28. This induced potential results in a positive level out of receiver 38. Once the potential across primary winding 26 achieves a steady-state condition, there is no longer a changing current and no potential is induced across secondary winding 28. Thus, as soon as the residual energy stored in the secondary circuit is depleted, e.g., in the input capacitance of receiver 38, the logic level signal at the output of receiver 38 will go low. It has been seen that, in the absence of capacitor 24, the system of the present example can sustain a positive pulse through transformer 30 only for between 800 and 1000 nanoseconds.

With the inclusion of capacitor 24 in the primary circuit of the present example, a positive transition at the leading edge of a positive pulse out of driver 22 is coupled through capacitor 24 and transformer 30, resulting in a positive transition from receiver 38. As the pulse from driver 22 remains high, the potential across capacitor 24 builds up, resulting in a diminishing potential across primary winding 26 over a period of time. This changing potential is attended by a current change which is coupled through transformer 30 onto secondary winding 28, and receiver 38 continues to generate a high logic level signal. The inclusion of capacitor 24, as shown, permits a positive pulse to be sustained through transformer 30 such that receiver 38 can provide a pulse having width in excess of 1700 nanoseconds. In addition, it has been seen that the use of capacitor 24 improves the response features of the minimum length pulses through transformer 30, those having pulse width of 340 nanoseconds.

A beneficial effect of using CMOS digital devices as driver 22 and receiver 38, beyond the obvious advantages of high speed and extremely low power consumption, is the ability of CMOS logic to operate over a wide range of $V_{cc}$, typically between 2 and 18 volts. As a general rule, a CMOS device will treat an input signal as a high logic level which is 70% of $V_{cc}$ or greater, and will treat an input signal as a low logic level which is 30% of $V_{cc}$ or less.

In this example, the benefit of the wide range of acceptable values of $V_{cc}$ may be utilized by setting $V_{cc}$ near or at its maximum value for driver 22 and near or at its minimum value for receiver 38. Thus, for the case of a high level pulse of long duration out of source 20, driver 22 provides a high amplitude pulse and, as the rate of change of charge depletion across capacitor 24 decreases and the voltage induced in the secondary winding 28 of rotary transformer 30 drops, receiver 38 still treats its incoming signal as a high logic level at least until the level drops below $(0.7)V_{cc}$ which, for the case of $V_{cc}=2$ volts, is as low as 1.4 volts.

In the present example, rotary transformer 30 comprises a primary winding 26 of four turns, a secondary winding 28 of ten turns, and annular coil forms 34 and 36 fabricated from a highly permeable, ferromagnetic material, such as type MN80, sold by Ceramic Magnetics, Inc., of Fairfield, N.J. It will be recognized that these parameters have been selected in an effort to optimize performance of transformer 30 over the effective square wave frequency range of approximately 285 KHz to 1.5 MHz, and that changes in these parameters will be required for other frequency ranges.

It was previously mentioned that the present invention finds application in systems providing multi-channel tape recording operation. Although only one rotary transformer, capacitor, driver and receiver are shown in the FIG. 1 embodiment, it will be understood that shaft 11 and rotatable carriage 12 may include a plurality of rotary transformers, together with their respective capacitors, drivers and receivers, to thereby provide multi-channel operation.

It was also mentioned earlier that it is desired to operate the recording system of the present example at minimum power, and thus facilitate the system's portability. By employing high input impedance drivers and receivers of the type described, the power required to transfer data between the stationary platform and the rotatable headwheel, at the frequency rates specified, has been kept to ninety milliwatts per wideband channel.

While the principles of the present invention have been demonstrated with particular regard to the illustrated structure of the figures, it will be recognized that various departures from such illustrative structure may be undertaken in the practice of the invention. As an example, although the foregoing description and the figures disclose a recording system in which the digital data source is located on the stationary platform and the signal utilization means is located on the headwheel, it is considered well within the ability of one skilled in the art to alter the invention so as to describe a playback system having data flow from the headwheel to the stationary platform. The scope of this invention is not intended to be limited to the structure disclosed herein but should instead be gauged by the breadth of the claims which follow.

What is claimed is:

1. An apparatus for coupling digital signals from a source to a utilization means, said digital signals being transmitted between a stationary platform and a rotatable carriage, said rotatable carriage adapted to be rotated about a shaft on said stationary platform, said apparatus comprising:
    a first inductive element wound about the axis of said shaft;
    a second inductive element on said rotatable carriage positioned so as to be inductively coupled with said first inductive element, wherein one of said first and second inductive elements is a primary coil and is coupled to said source and the other of said first and second inductive elements is a secondary coil and is coupled to said utilization means; and
    a capacitor coupled in series between said source and said primary coil, said capacitor diminishing over a period of time the potential across said primary coil produced by the voltage levels of each of said digital signals from said source, to thereby provide signals of changing current through said primary coil.

2. The apparatus according to claim 1 further including first and second annular elements of a magnetically permeable substance in proximity to said first and second inductive elements, respectively, for providing a path for flux lines of a magnetic field.

3. The apparatus according to claim 2 wherein said first and second inductive elements and said first and second annular elements of a magnetically permeable substance comprise a rotary transformer.

4. The apparatus according to claim 1 further including a digital driver circuit coupled between said source and said primary coil and a high impedance digital receiver coupled between said secondary coil and said utilization means.

5. The apparatus according to claim 1 wherein said source provides signal pulses having widths between approximately 350 and 1700 nanoseconds.

6. An apparatus for coupling digital signals from a stationary source to a utilization means with a rotatable carriage, said rotatable carriage adapted to be rotated about a stationary shaft, said apparatus including:
    as first coil wound about the axis of said shaft;
    a second coil in said rotatable carriage and positioned so as to be inductively coupled with said first coil, said second coil being coupled to said utilization means; and
    a capacitor coupled in series between said source and said first coil, said capacitor diminishing over a period of time the potential across said first coil produced by the voltage levels of each of said digital signals from said source, to thereby provide signals of changing current through said first coil.

7. The apparatus according to claim 6 further including first and second annular elements of a magnetically permeable substance in proximity to said first and second coils, respectively, for providing a path for flux lines of a magnetic field.

8. The apparatus according to claim 7 wherein said first and second coils and said first and second annular elements of a magnetically permeable substance comprise a rotary transformer.

9. The apparatus according to claim 6 further including a digital driver circuit coupled between said source and said first coil and a high impedance digital receiver coupled between said second coil and said utilization means.

10. The apparatus according to claim 6 wherein said source provides signal pulses having widths between approximately 350 and 1700 nanoseconds.

11. A tape recording/playback system comprising:
    a stationary platform including a shaft;
    source means on said stationary platform for generating digital signals;
    a rotatable carriage adapted to be rotated about said shaft;
    signal utilization means located on said rotatable carriage;
    a first inductive element on said shaft and wound about the axis of said shaft;
    a second inductive element on said rotatable carriage and positioned so as to be inductively coupled with said first inductive element, said second inductive element being coupled to said signal utilization means; and
    a capacitor coupled in series between said source means and said first inductive element, said capacitor diminishing over a period of time the potential across said first inductive element produced by the voltage levels of each of said digital signals from said source means, to thereby provide signals of changing current through said first inductive element.

12. The system according to claim 11 wherein said source means generates signal pulses having widths between approximately 350 and 1700 nanoseconds.

13. The system according to claim 11 wherein said rotatable carriage comprises a headwheel.

14. The system according to claim 11 further including first and second annular elements of a magnetically permeable substance in proximity to said first and second inductive elements, respectively, for providing a path for flux lines of a magnetic field.

15. The system according to claim 14 wherein said first and second inductive elements and said first and second annular elements of a magnetically permeable substance comprise a rotary transformer.

16. The system according to claim 11 further including a digital driver circuit coupled between said source means and said first inductive element and a high impedance digital receiver coupled between said second inductive element and said signal utilization means.

* * * * *